United States Patent
Koseki et al.

(10) Patent No.: US 6,190,753 B1
(45) Date of Patent: Feb. 20, 2001

(54) BIAXIALLY ORIENTED POLYESTER FILM FOR MAGNETIC RECORDING MEDIA

(75) Inventors: Masafumi Koseki; Hideaki Watanabe, both of Kanagawa (JP)

(73) Assignee: Teijin Limited, Osaka (JP)

( * ) Notice: Under 35 U.S.C. 154(b), the term of this patent shall be extended for 0 days.

(21) Appl. No.: 09/367,058

(22) PCT Filed: Dec. 2, 1998

(86) PCT No.: PCT/JP98/05443

§ 371 Date: Aug. 6, 1999

§ 102(e) Date: Aug. 6, 1999

(87) PCT Pub. No.: WO99/29488

PCT Pub. Date: Jun. 17, 1999

(30) Foreign Application Priority Data

Dec. 11, 1997 (JP) .................................................. 9-341231

(51) Int. Cl.[7] .......................................................... B32B 3/10
(52) U.S. Cl. ....................... 428/141; 428/143; 428/147; 428/213; 428/220; 428/323; 428/327; 428/338; 428/480; 428/694 SG; 428/900; 428/910; 528/298; 524/425; 524/430
(58) Field of Search ................................... 528/141, 143, 528/147, 213, 220, 323, 327, 338, 480, 694 SG, 900, 910, 298; 524/425, 430

(56) References Cited

U.S. PATENT DOCUMENTS

| | | | |
|---|---|---|---|
| 5,006,589 | * | 4/1991 | Sakamoto et al. .................... 524/430 |
| 5,051,292 | * | 9/1991 | Katoh et al. .......................... 428/141 |
| 5,252,388 | * | 10/1993 | Murooka et al. ..................... 428/328 |
| 5,415,930 | * | 5/1995 | Etchu et al. ........................... 428/323 |
| 5,439,738 | * | 8/1995 | Chujo et al. ........................... 428/332 |
| 5,665,454 | * | 9/1997 | Hosol et al. ........................... 428/141 |
| 5,958,553 | * | 9/1999 | Hosol et al. ........................... 428/141 |
| 5,958,568 | * | 9/1999 | Mizutani et al. ..................... 428/216 |
| 6,068,909 | * | 5/2000 | Koseki et al. ........................ 428/141 |

FOREIGN PATENT DOCUMENTS

| | | |
|---|---|---|
| 3-93024 | 4/1991 | (JP) . |
| 5-212787 | 8/1993 | (JP) . |
| 6-46450 | 2/1994 | (JP) . |
| 7-223288 | 8/1995 | (JP) . |

OTHER PUBLICATIONS

International Search Report.

* cited by examiner

*Primary Examiner*—Samuel A. Acquah
(74) *Attorney, Agent, or Firm*—Sughrue, Mion, Zinn, Macpeak & Seas, PLLC

(57) ABSTRACT

The present invention relates to a biaxially oriented polyester film for magnetic recording medium having a thickness of thinner than 7 μm and satisfying the formula $$1 \le P - \frac{(\alpha t + \alpha h)}{10} \le 10$$

wherein αt (×10$^{-6}$/° C.) is the thermal expansion coefficient of the film in transversal direction, αh (×10$^{-6}$/%RH) is the humidity expansion coefficient in transversal direction and P (ppm/g) is the transversal shrinkage of the film under the load (grams) applied to the film in machine direction. It has thin film thickness, excellent dimensional stability and small dimensional change in the direction of width (transversal direction) especially under a load in the direction of the length of the film (machine direction) and useful as a magnetic recording medium, especially a digital data storage tape generating little error in magnetic recording and reproduction, free from the generation of error rate caused by track shift and having excellent output characteristics.

14 Claims, 1 Drawing Sheet

BIAXIALLY ORIENTED POLYESTER FILM FOR MAGNETIC RECORDING MEDIA

TECHNICAL FIELD

The present invention relates to a biaxially oriented polyester film for magnetic recording medium. More particularly, it relates to a biaxially oriented polyester film having thin film thickness, excellent dimensional stability and small dimensional change in the direction of width (transversal direction) especially under a load in the direction of the length of the film (machine direction) and useful as a base film for a magnetic recording medium generating little error in magnetic recording and reproduction, especially for a digital data storage tape.

BACKGROUND ARTS

Polyester films are widely used in the fields of magnetic recording medium, electrical insulation material, packaging material, etc., owing to the excellent thermal and mechanical properties.

The development of a magnetic recording medium of digital recording system is recently in progress to enable the recording and reproduction of picture and sound in improved quality compared with conventional analog recording system. The recent progress of the medium for the digital recording system aims at high capacity, high recording density, long recording time and compact-sized cassette as well as high picture quality and sound quality and the requirement on the properties of the base film is increasing according to the improvement of the above qualities.

It is necessary to decease the thickness of a magnetic tape and, accordingly, the thickness of a base film for prolonging the recording time and reducing the cassette size. However, the rigidity of a tape decreases with decreasing thickness of a magnetic tape to deteriorate the contact of the tape with a magnetic head in recording and reproduction, which makes difficult to get high picture quality and sound quality.

The track pitch is selected to be extremely narrow especially in the data-storage use adopting a linear track system such as QIC (Quarter Inch Cartridge) and DLT (Digital Liner Tape) for getting high capacity and high density. The narrow track pitch produces a problem of error by the shift of track caused by the dimensional change in the transversal direction of the tape.

These dimensional changes are supposed to be caused by the changes in the temperature and humidity in the use of the magnetic tape and the variation of tape width induced by the variation of the transport tension of the tape inherent to the recent compact-sized drive. The extent of the influence of each factor is not yet clear to produce a problem in the case of increasing the capacity and density of a magnetic tape.

DISCLOSURE OF THE INVENTION

An object of this invention is to solve the above problems and provide a biaxially oriented polyester film having thin thickness and excellent dimensional stability, exhibiting small dimensional change in the direction of width (transversal direction) especially under a load applied in the direction of the film length (machine direction), and useful as a base of a magnetic recording medium having low error rate in magnetic recording and reproduction.

Another object of this invention is to provide a biaxially oriented polyester film useful as a base of a magnetic recording medium which is less liable to generate error rate caused by track shift and has improved output characteristics in a linear-track digital data storage use.

The object of this invention can be achieved by a biaxially oriented polyester film for magnetic recording medium having a thickness of less than 7 μm and satisfying the formula $$1 \leq P - \frac{(\alpha t + \alpha h)}{10} \leq 10$$

wherein $\alpha t$ ($\times 10^{-6}/°$ C.) is the thermal expansion coefficient of the film in transversal direction, $\alpha h$ ($\times 10^{-6}/\%RH$) is the humidity expansion coefficient in transversal direction and P (ppm/g) is the transversal shrinkage of the film under the load (grams) applied to the film in machine direction.

BRIEF EXPLANATION OF THE DRAWING

The FIG. 1 is an explanatory drawing of an apparatus for measuring the shrinkage factor of a film in transversal direction.

DETAILED EXPLANATION OF THE INVENTION

Figure 1:
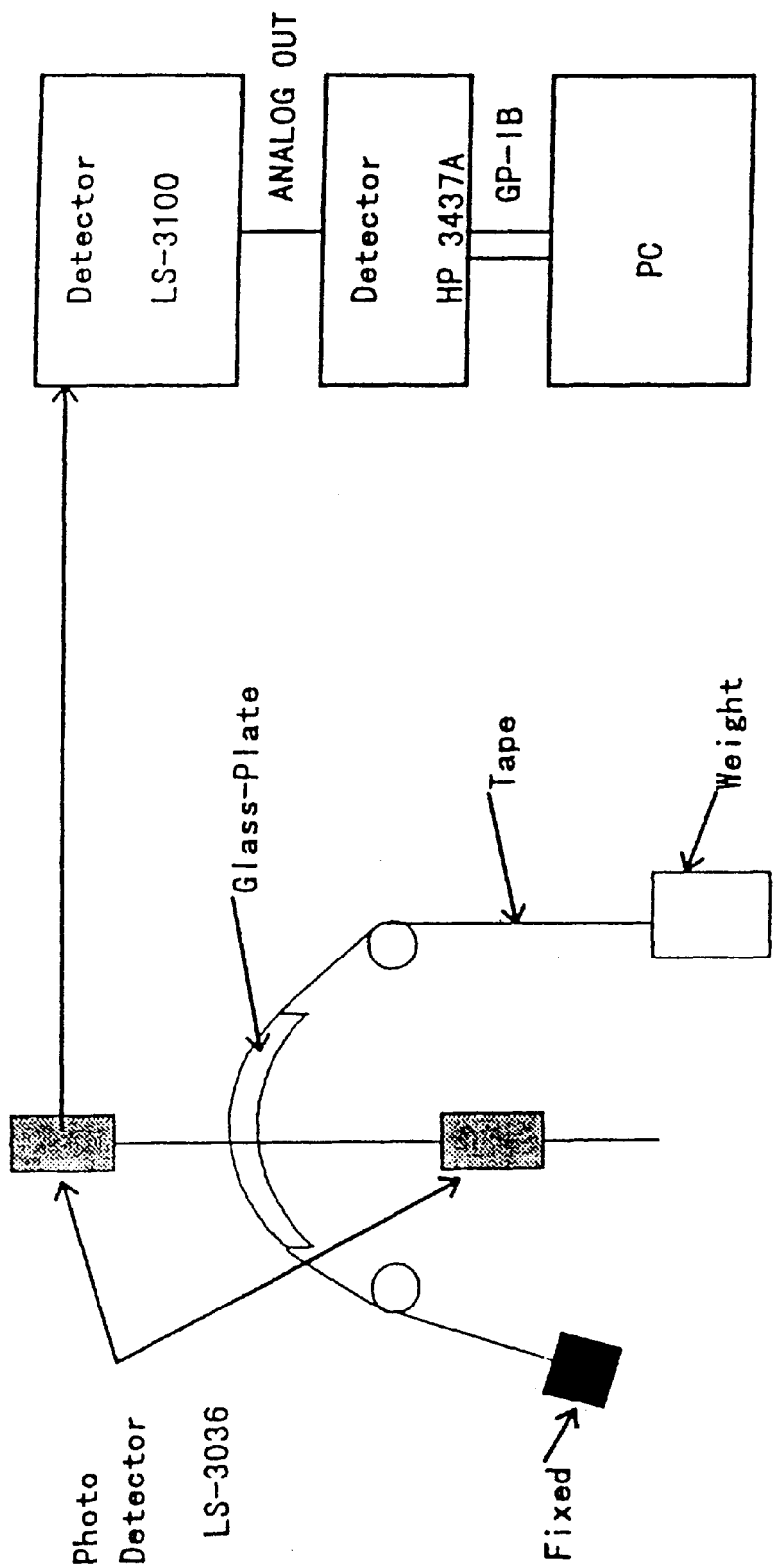

The polyester in the present invention is an aromatic polyester such as polyethylene terephthalate, polyethylene isophthalate, polybutylene terephthalate, polyethylene-2,6-naphthalate and polyethylene-α,β-bis(2-chlorophenoxy)ethane-4,4'-dicarboxylate. Preferable polyesters for the present invention among the above polyesters are polyethylene terephthalate, polyethylene-2,6-naphthalate and polyethylene-α,62-bis(2-chlorophenoxy)ethane-4,4'-dicarboxylate, particularly polyethylene terephthalate and polyethylene-2,6-naphthalate and especially polyethylene-2,6-naphthalate.

The polyester is preferably a homopolymer, however, a copolymer may be used as the polyester. The copolymor preferably has a copolymerized component content of 20 mol % or below, especially 10 mol % or below based on the total acid component. For example, in the case of a copolymer based on polyethylene-2,6-naphahalate, the preferable copolymer is composed of an acid component comprising not less than 80 mol %, especially not less than 90 mol % of 2,6-naphthalene dicarboxylic acid component and not more than 20 mol %, especially not more than 10 mol % of a copolymerized acid component (such as terephthalic acid, isophthalic acid or adipic acid) and ethylene glycol component, or composed of a 2,6-naphthalene dicarboxylic acid component, not less than 80 mol %, especially not less than 90 mol % of ethylene glycol component and not more than 20 mol %, especially not more than 10 mol % of a copolymerized glycol component (such as diethylene glycol, tetramethylene glycol or cyclohexanedimethanol).

The polyester to be used in the present invention may be a mixture of two or more kinds of polyesters cited above. It may contain various additives to an extent not to inhibit the effect of the present invention.

Such polyester can be produced usually by conventional melt-polymerization method and, in some cases, by the combination of the melt-polymerization and solid-phase polymerization. The intrinsic viscosity of the polyester (measured at 25° C. using o-chlorophenol as the solvent) is preferably within the range of from 0.45 to 0.90 dl/g.

The biaxially oriented polyester film of the present invention is required to satisfy the following formula (1)

$$1 \le P - \frac{(\alpha t + \alpha h)}{10} \le 10 \quad (1)$$

preferably the following formula (2)

$$1 \le P - \frac{(\alpha t + \alpha h)}{10} \le 5 \quad (2)$$

wherein $\alpha t$ ($\times 10^{-6}/°$ C.) is the thermal expansion coefficient of the film in transversal direction, $\alpha h$ ($\times 10^{-6}/\%RH$) is the humidity expansion coefficient in transversal direction and P (ppm/g) is the transversal shrinkage of the film under the load (grams) applied to the film in machine direction.

When the value of the above formula (P−($\alpha t+\alpha h$)/10) exceeds 10, the transversal dimensional change of a magnetic tape made of the film becomes undesirably large to cause the track shift trouble. A film having the above (P−($\alpha t+\alpha h$)/10) value of smaller than 1 cannot be produced by the polyester to be used in the present invention.

The transversal thermal expansion coefficient $\alpha t$ ($\times 10^{-6}/°$ C.) is preferably −5 to +25 ($\times 10^{-6}/°$ C.), more preferably −5 to +20 ($\times 10^{-6}/°$ C.), especially −4 to +17 ($\times 10^{-6}/°$ C.) in the present invention, and the transversal humidity expansion coefficient $\alpha h$ ($\times 10^{-6}/\%RH$) is preferably 5 to 20 ($\times 10^{-6}/\%RH$), more preferably 7 to 15 ($\times 10^{-6}/\%RH$), especially 8 to 15 ($\times 10^{-6}/\%RH$). The above shrinkage factor P is preferably 3 to 10 (ppm/g), more preferably 5 to 10 (ppm/g), especially 5.5 to 9 (ppm/g).

The biaxially oriented film of the present invention is required to have a thickness of thinner than 7 $\mu$m. A film having a thickness of 7 $\mu$m or above is undesirable for prolonging the playing time of a tape and reducing the size of the cassette. The lower limit of the film thickness is preferably 3 $\mu$m.

The sum of the Young's moduli in machine direction and transversal direction is preferably 1,200 kg/mm$^2$ or above, more preferably 1,300 kg/mm$^2$ or above in the biaxially oriented polyester film of the present invention. The ratio of the Young's modulus in machine direction of the film $E_M$ to the Young's modulus in transversal direction $E_T$ ($E_M/E_T$) is preferably between 2.0 and 0.9 to get further remarkable effect of the present invention. The Young's modulus in machine direction is preferably 650 to 1,100 kg/mm$^2$, more preferably 650 to 950 kg/mm$^2$ and especially 700 to 900 kg/mm$^2$, and the Young's modulus in transversal direction is preferably 400 to 800 kg/mm$^2$, more preferably 550 to 800 kg/mm$^2$ and especially 600 to 750 kg/mm$^2$. The use of polyethylene-2,6-naphthalate as the polyester is preferable from the viewpoint of Young's modulus to get further remarkable effect of the present invention.

The biaxially oriented polyester film of the present invention preferably has a thermal shrinkage of 0.01% or below, more preferably 0.008% or below in machine direction in the case of heat-treating the film at 65° C. for 9 days under no-load condition. When the thermal shrinkage is too large, a thermal irreversible change takes place after forming a tape to generate a skew distortion on a screen in case of reproducing at a temperature different from the recording temperature in VTR, etc. In a tape for data storage use, large thermal shrinkage is also undesirable to generate a track shift and cause the error rate.

The thermal shrinkage can be lowered by increasing the heat-treating temperature (heat-setting temperature) after drawing, and the procedure is preferable for producing the film of the present invention. However, the method for lowering the thermal shrinkage is not limited to this procedure.

The biaxially oriented polyester film of the present invention has a surface roughness WRa of 2.0 to 6.0 nm, more preferably 3.0 to 5.0 nm on the surface for applying the magnetic layer. When the surface roughness exceeds 6.0 nm, the surface of the magnetic layer of the magnetic tape is roughened to undesirably deteriorate the output characteristics. On the contrary, surface roughness of smaller than 2.0 nm lowers the slipperiness between the films to deteriorate the windability of the film.

The surface roughness WRa can be adjusted for example by the incorporation of the film with inert fine particles such as inorganic fine particles containing the elements of the groups IIA, IIB, IVA or IVB of the periodic table (e.g. kaolin, alumina, titanium oxide, calcium carbonate or silicon dioxide) or fine particles of a polymer having high heat-resistance such as a silicone resin or a crosslinked polystyrene or by the surface-treatment to form a fine roughness such as the coating with a slip-improving coating material.

In the case of including inorganic fine particles, the average diameter of the particle is 0.05 to 0.8 $\mu$m, more preferably 0.2 to 0.6 $\mu$m, especially 0.2 to 0.5 $\mu$m and above all 0.3 to 0.5 $\mu$m, and the amount of the particle is preferably 0.05 to 0.5% by weight (based on the polymer), more preferably 0.1 to 0.3% by weight (based on the polymer) and especially 0.1 to 0.2% by weight (based on the polymer). When the above fine particles are composed of two kinds of particles having large diameter and small diameter, fine particles having an average particle diameter of preferably 0.05 to 0.3 a m, more preferably 0.1 to 0.3 $\mu$m and especially 0.1 to 0.2 $\mu$m are used as the small particles in an amount of preferably 0.05 to 0.4% by weight (based on the polymer), more preferably 0.1 to 0.3% by weight (based on the polymer) and especially 0.1 to 0.2% by weight (based on the polymer), and particles having an average particle diameter of preferably 0.3 to 1.0 $\mu$m, more preferably 0.3 to 0.8 $\mu$m and especially 0.4 to 0.6 $\mu$m are used as the large particles in an amount of preferably 0.005 to 0.4% by weight (based on the polymer), more preferably 0.01 to 0.3% by weight (based on the polymer) and especially 0.01 to 0.03% by weight (based on the polymer). The difference of the average particle diameters of the large particles and the small particles is preferably 0.2 $\mu$m or above, more preferably 0.3 $\mu$m or above and especially 0.4 $\mu$m or above. The average diameter difference is advantageous for compatibilizing the windability and the electromagnetic conversion characteristics.

The addition of the above inert fine particles to the polyester is preferably carried out by uniformly dispersing the fine particles in e.g. ethylene glycol used as a glycol component in the form of a slurry and using the obtained ethylene glycol slurry as a part of the reaction raw materials. An alternative allowable method is the mixing of an aqueous slurry of the particles directly to a prescribed polyester and the kneading of the mixture with a vented twin-screw kneading extruder.

Effective method for adjusting the content of the particles in the film is to prepare a concentrated master polymer by the above process and dilute the master polymer with a polymer essentially free from particles in the film-forming process.

Any conventional method can be used for the production of the biaxially oriented polyester film of the present invention, however, the following production process is preferable.

The process comprises the extrusion of the polyester in molten state preferably at a temperature between the melting point (Tm:° C.) and (Tm+70)° C., the solidification of the extruded polyester by quenching to form an undrawn film, the drawing of the undrawn film in one direction (machine direction or transversal direction) at a prescribed draw ratio at a temperature between (Tg–10) and (Tg+70)° C. (Tg is the glass transition temperature of the polyester), the drawing of the uniaxially drawn film in the direction perpendicular to the first stage draw direction (the second stage draw direction is transversal when the 1st stage drawing is in machine direction) at a prescribed draw ratio at a temperature between Tg and (Tg+70)° C. and the heat-setting of the biaxially oriented film. The melt-extrusion is preferably carried out by installing a high-precision filter, a static mixer and a gear pump in a polymer flow channel. The high-precision filter has a 95% filtration diameter of preferably 10 μm, more preferably 5 μm and especially 3 μm. The draw ratio, drawing temperature, heat-setting conditions, etc., are selected based on the characteristics of the film, and the draw ratio in machine direction is selected preferably within the range of 4 to 6, more preferably 4.5 to 5.5, the draw ratio in transversal direction is selected preferably within the range of 3 to 6, more preferably 3.5 to 5.5, and the drawing temperature is selected preferably within the range of (Tg–10) to (Tg+70)° C. in the drawing in machine direction and Tg to (Tg+70)° C. in the drawing in transversal direction. The heat-setting temperature and time are preferably selected from the ranges of 190 to 250° C. and 1 to 60 seconds, respectively. The areal draw ratio is set to preferably 9 to 22, more preferably 12 to 22.

A simultaneous biaxial drawing method may be used as well as the above-mentioned successive biaxial drawing method. The numbers of drawing in machine direction and transversal direction are not restricted to once in each direction in the successive biaxial drawing, and the longitudinal-transversal drawing may be performed by several drawing procedures and there is no limitation on the number of the procedures. For example, in the case of further improving the mechanical characteristics, the above biaxially drawn film before the heat-setting treatment is preferably heat-treated at a temperature between (Tg+20) and (Tg+70)° C., the heat-treated film is drawn in the machine direction or transversal direction at a temperature higher than the heat-setting temperature by 10 to 40° C., and the obtained film is successively drawn in the transversal direction or machine direction at a temperature higher than the former drawing temperature by 20 to 50° C. to attain a total draw ratio of 4 to 6 in the case of the drawing in machine direction or 3 to 6 in the case of transversal drawing.

The biaxially oriented film of the present invention is useful as a base film of a high-density magnetic recording medium, especially a base film of a video tape for digital recording system or a computer tape for data-storage use. Furthermore, it is useful as a base film of a magnetic tape for computer of linear track recording system or a tape for data storage use (QIC, DLT, LTO, etc.).

EXAMPLES

The present invention is described in more detail by the following Examples. Various physical values and characteristics in the present invention were measured and defined by the following methods. The term "parts" in the examples means "parts by weight".

(1) Young's modulus

A specimen cut from a film to a width of 10 mm and a length of 15 cm was pulled by an Instron-type universal tensile testing machine at a chuck separation of 100 mm, a pulling rate of 10 mm/min and a chart speed of 500 mm/min, and the Young's modulus was calculated from the tangent of the rising part of the obtained stress-strain curve.

(2) Surface roughness of film (WRa)

The measurement was carried out by using a non-contact three-dimensional roughness tester manufactured by WYKO (TOPO-3D) at a measuring magnification of 40 and a measuring area of 242 μm×239 μm (0.058 mm$^2$), and the value of WRa was calculated and outputted by the surface analysis with a software built in the tester according to the following formula.

$$WRa = \sum_{k=1}^{M} \sum_{j=1}^{N} |Z_{jk} - \overline{Z}|/(M \cdot N)$$

wherein $$\overline{Z} = \sum_{k=1}^{M} \sum_{j=1}^{N} Z_{jk}/(M \cdot N)$$

$Z_{jk}$ is the height on the two-dimensional roughness chart at the cross point of the j-th line and the k-th line when the measuring area is divided into M in the measuring direction (242 μm) and into N in the direction perpendicular to the measuring direction (239 μm), respectively.

(3) Average particle diameter of inert particles

Particle size was measured by a Type CP-50 Centrifugal Particle Size Analyzer manufactured by Shimadzu Corp. The particle diameter corresponding to 50 mass percent was read from the cumulative curve of the particle size and its content calculated based on the obtained centrifugal precipitation curve, and the obtained value was used as the average particle diameter.

(4) Temperature expansion coefficient (αt)

A film specimen of 15 mm long and 5 mm wide was cut from a film in transversal direction, set in TMIA3000 manufactured by SINKU-RIKO Inc., pretreated at 60° C. for 30 minutes in nitrogen atmosphere and cooled to room temperature. The cooled specimen was heated from 25° C. to 70° C. at a heating rate of 2° C./min, the length of the specimen was measured at each temperature, and the temperature expansion coefficient (αt) was calculated from the following formula.

$$\alpha t = \{(L2-L1) \times 10^6/(L1 \times \Delta T)\}$$

wherein

L1 is the specimen length (mm) at 45° C.,

L2 is the specimen length (mm) at 55° C. and

ΔT is 10 (=55–45° C.).

(5) Humidity expansion coefficient (αh)

A film specimen of 15 mm long and 5 mm wide was cut from a film in transversal direction, set in TMIA3000 manufactured by SINKU-RIKO Inc., and maintained in nitrogen atmospheres having humidity levels controlled to 20%RH and 80%RH, the lengths of the specimen were measured at the conditioned states and the humidity expansion coefficient was calculated from the following formula.

$$\alpha h = \{(L2-L1) \times 10^6/(L1 \times \Delta H)\}$$

wherein

L1 is the specimen length at 20% RH,

L2 is the specimen length at 80% RH and

ΔH is 60(=80–20%RH).

(6) Shrinkage factor P in lateral direction under a load applied to the film in machine direction A film slit to ½ inch wide was set in a manner shown in the FIG. 1 in an atmosphere of 22° C. and 60% humidity (the direction of the length of the film slit to ½ inch was the machine direction of the film). The specimen slit to ½ inch wide was metallized with gold by sputtering to enable the determination of the outer diameter by a detector. One end of the film was loaded with weight of 20 g, 80 g, 160 g and 240 g (the other end of the film was fixed) and the width of the film was measured by a laser diameter tester manufactured by KEYENCE Corp. (main body: type-3100, sensor: type 3060) and the shrinkage factor (ppm) for each load was calculated by the following formula.

Shrinkage factor (ppm)=$(W0-W1)\times 10^6/W0$ wherein W0 is the length (mm) of the film in lateral direction under the load of 0 gram, and W1 is the length (mm) of the film in lateral direction under each load described above.

The shrinkage factor (ppm/g) for the load was calculated from the shrinkage data (ppm) at each load (g) obtained by the above formula. The measurement was repeated 10 times (n=10) and the shrinkage was shown by the average value.

(7) Thermal shrinkage

A film of about 30 cm long and 1 cm wide was accurately measured its length, put into an oven set to 65° C. under no-load, heat-treated for 9 days and taken out of the oven, and the dimensional change was measured after cooling the film to room temperature. The thermal shrinkage was calculated from the length ($L_0$) before the heat-treatment and the change in length ($\Delta L$) caused by the heat-treatment by the following formula.

$$\text{Thermal shrinkage} = \frac{\Delta L}{L_0} \times 100$$

(8) Error rate

Error rate was measured under the following conditions by using ML4500B, system for QIC, manufactured by Media Logic Inc.

Current=15.42 mA

Frequency: 0.25 MHz

Location=0

Threshold: 40.0

Bad/Good/Max: 1:1:1

Tracks: 28

The error rate number was expressed by the average value on the measured tracks (n=28).

(9) Electromagnetic conversion characteristics

The characteristics were measured by using ML4500B, system for QIC, manufactured by Media Logic Inc.

Example 1

A polyethylene terephthalate having an intrinsic viscosity (o-chlorophenol, 25° C.) of 0.56 dl/g and containing 0.01% by weight of crosslinked silicone resin particles having an average particle diameter of 0.6 μm and 0.3% by weight of alumina particles having an average particle diameter of 0.1 μm was dried at 170° C. for 3 hours, extruded in molten state at 300° C. and quenched and solidified on a casting drum maintained at 25° C. to obtain an undrawn film.

The obtained undrawn film was preheated at 75° C., drawn at a draw ratio of 2.25 between a low-speed roll and a high-speed roll under heating with an IR heater having a surface temperature of 830° C. and placed 14 mm above the film, quenched, supplied to a stenter and drawn in transversal direction at 110° C. at a draw ratio of 3.6. Subsequently, the drawn film was preheated at 110° C., drawn 2.5 times in machine direction between a low-speed roll and a high-speed roll, supplied to a stenter and heat-set at 240° C. for 2 seconds to obtain a biaxially oriented film having a thickness of 6.0 μm.

Separately, a magnetic paint was prepared by putting a composition shown below into a ball mill, kneading and dispersing for 16 hours, adding 5 parts by weight of an isocyanate compound (Desmodur L, manufactured by Bayer AG) and subjecting to high-speed shearing dispersion treatment for 1 hour.

The composition of the magnetic paint

| | |
|---|---|
| Acicular Fe particles | 100 parts |
| Vinyl chloride-vinyl acetate copolymer (S-LEC 7A; product of Sekisui Chemical Co., Ltd.) | 15 parts |
| Thermoplastic polyurethane resin | 5 parts |
| Chromium oxide | 5 parts |
| Carbon black | 5 parts |
| Lecithin | 2 parts |
| Fatty acid esters | 1 part |
| Toluene | 50 parts |
| Methyl ethyl ketone | 50 parts |
| Cyclohexanone | 50 parts |

The magnetic paint was applied to one surface of the above polyethylene terephthalate film to a thickness of 2 μm, oriented in a DC magnetic field of 2,500 Gauss, dried by heating at 100° C., subjected to the super-calender processing (linear pressure: 200 kg/cm, temperature: 80° C.) and wound to form a roll. The wound roll was left standing in an oven of 55° C. for 3 days.

Further, the film was coated with a back-coating material having the following composition to a thickness of 1 μm, dried, and slit to 6.35 mm wide(=1'/4) to obtain a magnetic tape.

The composition of the back-coating material

| | |
|---|---|
| Carbon black | 100 parts |
| Thermoplastic polyurethane resin | 60 parts |
| Isocyanate compound (Coronate L; Product of Nippon Polyurethane Ind. Co., Ltd.) | 18 parts |
| Silicone oil | 0.5 part |
| Methyl ethyl ketone | 250 parts |
| Toluene | 50 parts |

The characteristics of the obtained film and tape are shown in the Table 1. As is obvious from the Table 1, the product had low error rate and good output characteristics.

Example 2

An undrawn film was produced by a method similar to the Example 1, with the exception of the use of exclusively silica particles having an average particle diameter of 0.1 μm in place of the inert particles used in the Example 1. Biaxially drawn film and tape having a thickness of 6.0 μm were produced by drawing the undrawn film by a method similar to the Example 1, with the exception of the transversal draw ratio of 3.35 in the stenter. The results are shown in the Table 1. Desirable results were obtained similar to the Example 1.

Example 3

A polyethylene-2,6-naphthalate having an intrinsic viscosity of 0.63 dl/g and containing 0.015% by weight of calcium carbonate particles having an average particle diameter of 0.5 μm and 0.2% by weight of silica particles having an average particle diameter of 0.1 μm was dried at 180° C. for 5 hours, extruded in molten state at 300° C. and quenched and solidified on a casting drum maintained at 60° C. to obtain an undrawn film.

The obtained undrawn film was drawn at a draw ratio of 5.5 between a pair of rolls having speed difference, further drawn at a draw ratio of 4.1 in transversal direction by a tenter, and heat-treated at 220° C. for 10 seconds.

A biaxially oriented film having a thickness of 6 μm was produced by this process. A tape was manufactured by a method similar to the Example 1. The results are shown in the Table 1.

Good results were obtained similar to the Example 1.

Example 4

The Example 3 was repeated with the exception of the change of the longitudinal draw ratio to 5.0 and the transversal draw ratio to 4.5 (the other conditions were same as the Example 3) to obtain a film and a tape. The results are shown in the Table 1.

Good results were obtained similar to the Example 1.

Comparative Example 1

An undrawn film was produced by a method similar to the Example 1, and the obtained film was preheated at 75° C., heated with an IR heater having a surface temperature of 830° C. and placed 14 mm above the film between a low-speed roll and a high-speed roll, drawn 3.2 times, quenched, transferred to a stenter, drawn in transversal direction at 120° C. at a draw ratio of 4.2 and heat-set at 200° C. for 10 seconds to obtain a film having a thickness of 6 μm. A tape was produced from the film in a manner similar to the Example 1.

Since the product had the value of P−(αt+αh)/10 exceeding 10, a track shift took place resulting in a poor error rate.

Comparative Example 2

An undrawn film was produced by a method similar to the Example 3, with the exception of the use of 0.1% by weight of aluminum carbonate particles having an average particle diameter of 0.5 μm and 0.2% by weight of silica particles having an average particle diameter of 0.1 μm in place of the inert particles used in the Example 3.

A film and a tape were produced by drawing the undrawn film at a longitudinal draw ratio of 3.5 and a transversal draw ratio of 5.7 (the other conditions were same as the Example 3). The results are shown in the Table 1.

Since the product had the value of P−(αt+αh)/10 exceeding 10, a track shift took place to get a poor error rate, and the output characteristics were also poor owing to too large surface area.

TABLE 1

| Polymer | Unit | Example 1 PET | Example 2 PET | Example 3 PEN | Example 4 PEN | Comp. Example 1 PET | Comp. Example 2 PEN |
|---|---|---|---|---|---|---|---|
| Young's modulus | | | | | | | |
| (MD) | kg/mm$^2$ | 800 | 800 | 900 | 700 | 450 | 500 |
| (TD) | kg/mm$^2$ | 480 | 400 | 580 | 730 | 730 | 950 |
| Film Thickness | μm | 6 | 6 | 6 | 6 | 6 | 6 |
| αt (TD) | × 10$^{-6}$/° C. | 20.0 | 20.0 | 15.0 | 0.5 | 0.4 | −0.1 |
| αh (TD) | × 10$^{-6}$/% RH | 11.0 | 11.3 | 13.0 | 8.0 | 7.5 | 6.0 |
| Lateral shrinkage P under longitudinal load | ppm/g | 7.0 | 7.2 | 6.0 | 8.5 | 13.0 | 12.0 |
| $P - \frac{(\alpha t + \alpha h)}{10}$ | — | 3.9 | 4.1 | 3.2 | 7.7 | 12.2 | 11.4 |
| Surface roughness (WRa) | nm | 5.5 | 2.5 | 4.5 | 4.5 | 5.7 | 13.0 |
| Error rate | number/track | 3 | 4 | 3 | 3 | 30 | 25 |
| Electromagnetic conversion characteristics | dB | ±0 (standard) | +1 | +0.5 | +0.7 | ±0 | −2.5 |

Example 5

A polyethylene-2,6-naphthalate having an intrinsic viscosity (o-chlorophenol, 25° C.) of 0.63 dl/g and containing 0.2% by weight of monodisperse silica particles having an average particle diameter of 0.1 μm and 0.015% by weight of calcium carbonate particles having an average particle diameter of 0.6 μm was dried at 180° C. for 5 hours, melted and extruded at 300° C., and quenched and solidified on a casting drum maintained at 60° C. to obtain an undrawn film.

The undrawn film was drawn 5.2 times between a pair of rolls having speed difference at 120° C., further drawn 4.3 times in transversal direction and heat-treated at 220° C. for 15 seconds.

The obtained biaxially oriented film having a thickness of 6 μm was wound in the form of a roll.

Separately, a magnetic paint was prepared by charging a composition described below in a ball mill, kneading and dispersing for 16 hours, adding 5 parts by weight of an isocyanate compound (Desmodur L, product of Bayer AG) and subjecting to high-speed shear dispersion treatment for 1 hour.

The composition of the magnetic paint

| | |
|---|---|
| Acicular Fe particle | 100 parts |
| Vinyl chloride-vinyl acetate copolymer (S-LEC 7A, product of Sekisui Chemical Co., Ltd.) | 15 parts |
| Thermoplastic polyurethane resin | 5 parts |
| Chromium oxide | 5 parts |
| Carbon black | 5 parts |
| Lecithin | 2 parts |
| Fatty acid ester | 1 part |
| Toluene | 50 parts |
| Methyl ethyl ketone | 50 parts |
| Cyclohexanone | 50 parts |

The magnetic paint was applied to one surface of the above polyethylene-2,6-naphthalate film to a thickness of 2 μm, subjected to orientation treatment in a DC magnetic field of 2,500 Gauss, dried by heating at 100° C. and finished by super-calender treatment (linear pressure: 200 kg/cm, temperature: 80° C.) and the coated film was wound in the form of a roll. The wound roll was left standing in an oven at 55° C. for 3 days.

A back-coating material having the following composition was applied to the film to a thickness of 1 μm and dried and the coated film was slit to 8 mm width to obtain a magnetic tape.

The composition of back-coating material

| | |
|---|---|
| Carbon black | 100 parts |
| Thermoplastic polyurethane resin | 60 parts |
| Isocyanate compound (Coronate L, product of Nippon Polyurethane Ind. Co., Ltd.) | 18 parts |
| Silicone oil | 0.5 part |
| Methyl ethyl ketone | 250 parts |
| Toluene | 50 parts |

The characteristics of the obtained film and tape are shown in the Table 2. As is obvious from the Table, the product had good delamination resistance and windability and excellent electromagnetic conversion characteristics, skew characteristics, transport durability and %.

Example 6

An undrawn film was produced by a method similar to the Example 5, with the exception of the use of 0.02% by weight of monodisperse silica fine particles having an average particle diameter of 0.1 μm as the small-diameter particle in place of the added inert solid particles of the Example 5.

The undrawn film was drawn 5.2 times between a pair of rolls having different speeds at 120° C., drawn in transversal direction by a tenter at a draw ratio of 4.3 and heat-treated at 220° C. for 10 seconds. The heat-treated film was further subjected to floating heat-treatment in an oven heated at 110° C. to effect 0.3% relaxation treatment and obtain a biaxially oriented film having a thickness of 4.5 μm.

A tape was produced from the film by a method similar to the Example 5. The results are shown in the Table 2. Good results were obtained similar to the Example 1.

Example 7

A film and a tape were produced in a manner same as the Example 5 from a polyethylene-2,6-napthalate containing 4,4'-diphenyldicarboxylic acid as an acid component in an amount of 3 mol % based on the total acid component and using the inert solid particles described in the Example 6. The results are shown in the Table 2. The product had good properties similar to the Example 5, and the delamination resistance was especially good.

TABLE 2

| | Unit | Example 5 | Example 6 | Example 7 |
|---|---|---|---|---|
| Polymer | — | PEN | PEN | PEN (copolymerized with 4,4'-D) |
| Added particle | | | | |
| kind | — | silica | silica | silica |
| particle size | μm | 0.1 | 0.1 | 0.1 |
| amount | wt. % | 0.3 | 0.2 | 0.2 |
| kind | — | calcium carbonate | calcium carbonate | calcium carbonate |
| particle size | μm | 0.6 | 0.6 | 0.6 |
| amount | wt. % | 0.015 | 0.015 | 0.015 |
| Film thickness | μm | 6 | 4.5 | 6 |
| Young's modulus | | | | |
| machine direction (MD) | kg/mm$^2$ | 890 | 860 | 850 |
| transversal direction (TD) | kg/mm$^2$ | 580 | 560 | 560 |
| αt (TD) | ×10$^{-6}$/° C. | 15.0 | 16.0 | 16.0 |
| αh (TD) | ×10$^{-6}$/% RH | 13.0 | 14.0 | 14.0 |
| Lateral shrinkage P under load in machine direction | ppm/g | 6.1 | 6.4 | 6.5 |
| $P - \dfrac{(\alpha t + \alpha h)}{10}$ | — | 3.3 | 3.4 | 3.5 |
| Surface roughness (WRa) | nm | 5.0 | 4.0 | 4.5 |
| Thermal shrinkage TD (65° C. × 9 days) | % | 0.008 | 0.004 | 0.006 |
| Error rate | number/track | 3 | 3 | 3 |
| Electromagnetic conversion characteristics | dB | +0.3 | +0.7 | +0.5 |

Effect of the Invention

The present invention provides a biaxially oriented polyester film having thin film thickness, excellent dimensional stability and small dimensional change in the direction of width (transversal direction) especially under a load in the direction of the length of the film (machine direction) and useful as a magnetic recording medium, especially a digital data storage tape, generating little error in magnetic recording and reproduction, free from the generation of error rate caused by track shift and having excellent output characteristics.

What is claimed is:

1. A biaxially oriented polyester film for magnetic recording medium characterized in that the thickness of the film is thinner than 7 μm and that the shrinkage P (ppm/g) of the film in transversal direction under a load (g) applied in machine direction of the film satisfies the following formula $$1 \leq P - \frac{(\alpha t + \alpha h)}{10} \leq 10$$

wherein αt (×10$^{-6}$/° C.) is the thermal expansion coefficient of the film in transversal direction and αh(×10$^{-6}$/%RH) is the humidity expansion coefficient of the film in transversal direction.

2. A biaxially oriented polyester film for magnetic recording medium described in the claim 1 provided that the shrinkage P (ppm/g) of the film in transversal direction under a load (g) applied in machine direction of the film satisfies the following formula $$1 \leq P - \frac{(\alpha t + \alpha h)}{10} \leq 5$$

wherein $\alpha t$ ($\times 10^{-6}$/° C.) is the thermal expansion coefficient of the film in transversal direction and $\alpha h$ ($\times 10^{-6}$/%RH) is the humidity expansion coefficient of the film in transversal direction.

3. A biaxially oriented polyester film for magnetic recording medium described in the claim 1 or 2 provided that the thermal expansion coefficient $\alpha t$ ($\times 10^{-6}$/° C.) of the film in transversal direction is −5 to +20 ($\times 10^{-6}$/° C.) or less and the humidity expansion coefficient $\alpha h$ ($\times 10^{-6}$/%RH) of the film in transversal direction is 5 to 20($\times 10^{-6}$/%RH).

4. A biaxially oriented polyester film for magnetic recording medium described in the claim 1 or 2 provided that the shrinkage P (ppm/g) of the film in transversal direction is 3 to 10 (ppm/g).

5. A biaxially oriented polyester film for magnetic recording medium described in the claim 1 provided that the longitudinal Young's modulus of the film is 650 kg/mm² or above and the lateral Young's modulus is 400 to 800 kg/mm².

6. A biaxially oriented polyester film for magnetic recording medium described in the claim 5 provided that the thermal shrinkage of the film in machine direction is 0.01% or less after keeping the film at 65° C. for 9 days under no-load condition.

7. A biaxially oriented polyester film for magnetic recording medium described in the claim 1 provided that the film contains 0.05 to 0.5% by weight of inert fine particles having an average particle diameter of from 0.05 to 0.8 µm.

8. A biaxially oriented polyester film for magnetic recording medium described in the claim 1 provided that the film contains 0.05 to 0.4% by weight of inert fine particles having an average particle diameter of from 0.05 to 0.3 µm as small particles and further contains 0.005 to 0.4% by weight of inert fine particles having an average particle diameter of from 0.3 to 1.0 µm as large particles.

9. A biaxially oriented polyester film for magnetic recording medium described in the claim 7 wherein the difference of the average particle diameters of the large particles and the small particles in the film is 0.2 µm or above.

10. A biaxially oriented polyester film for magnetic recording medium described in the claim 1 wherein the polyester is polyethylene-2,6-naphthalate.

11. A biaxially oriented polyester film for magnetic recording medium described in the claim 1 wherein the surface roughness WRa of the film surface to be covered with the magnetic layer is from 2.0 to 6.0 nm.

12. A biaxially oriented polyester film for magnetic recording medium described in the claim 1 wherein the film is a base film for a coating-type magnetic recording medium.

13. A biaxially oriented polyester film for magnetic recording medium described in the claim 1 wherein the film is a base film of a digital-recording type magnetic recording medium.

14. A biaxially oriented polyester film for magnetic recording medium described in the claim 1, 12 or 13 wherein the film is a base film of a magnetic recording medium for data storage use.

* * * * *